Sept. 10, 1946.  A. G. DEAN  2,407,480
AIRCRAFT FUSELAGE AND WING CONSTRUCTION
Filed Sept. 13, 1944  3 Sheets-Sheet 1

INVENTOR.
Albert G. Dean
BY
John P. Tarbox
ATTORNEY

Sept. 10, 1946. A. G. DEAN 2,407,480
AIRCRAFT FUSELAGE AND WING CONSTRUCTION
Filed Sept. 13, 1944 3 Sheets-Sheet 3
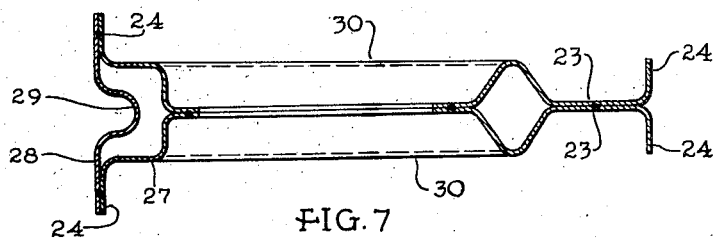
FIG. 7
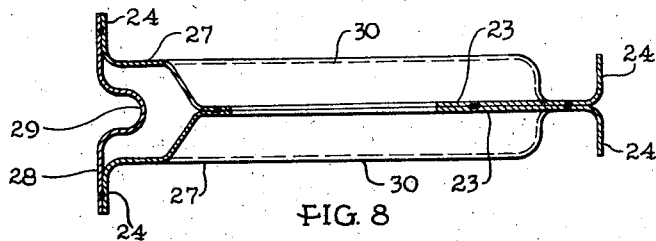
FIG. 8
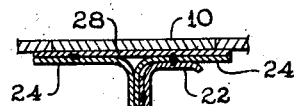
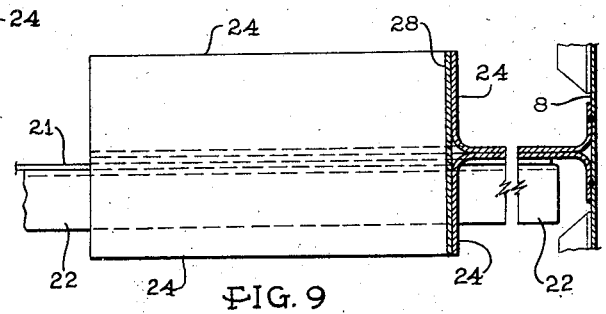
FIG. 10 FIG. 9
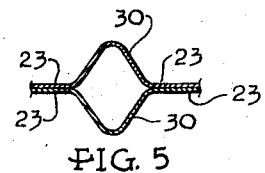
FIG. 5
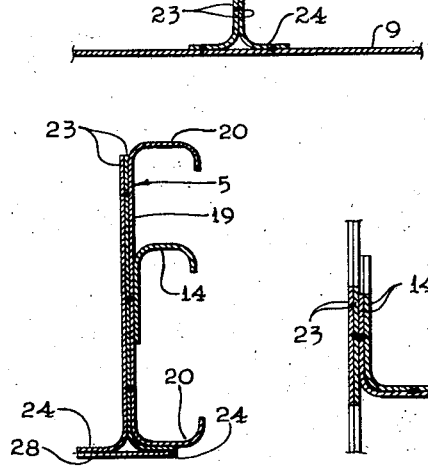
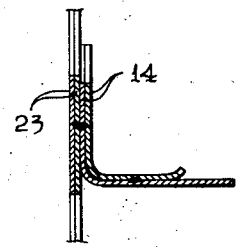
FIG. 3 FIG. 6
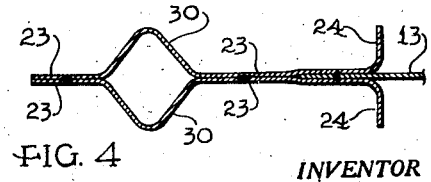
FIG. 4
INVENTOR
Albert G. Dean
BY John P. Tarbox
ATTORNEY Patented Sept. 10, 1946

2,407,480

UNITED STATES PATENT OFFICE 2,407,480

AIRCRAFT FUSELAGE AND WING CONSTRUCTION

Albert G. Dean, Narberth, Pa., assignor to The Budd Company, Philadelphia, Pa., a corporation of Pennsylvania Application September 13, 1944, Serial No. 553,890

4 Claims. (Cl. 244—119)

This invention relates to aircraft, particularly to airfoil-to-body connections for aircraft, and has for an object the provision of improvements in this art.

The present invention constitutes an improvement upon that disclosed in the copending application of Michael Watter and Albert G. Dean, Serial Number 492,494, filed June 28, 1943, and assigned to the assignee of the present application.

In the present, as in the former construction, there are a number of bulkheads (five shown) which constitute the full sides of body girdles and to which the spars and skin blankets of the wings are secured. There the bulkheads are formed each by a flat sheet of metal together with flanges and stiffening struts which are welded thereto; in the present construction the bulkheads are formed by one or a laminated pair of pressed full-size elements which include integral flanges and stiffening struts. There the spar web was secured to the bulkhead web by a splice plate; here the spar web is directly overlapped with the web or webs of the bukhead. There the upper and lower ends of the bulkhead were connected by splicing gussets to the girdle girders; here the ends of the monolithic bulkhead are extended to overlap the ends of the girders to which they are secured.

Over and above these specific improvements the present invention provides various other improvements in detail which will be evident from the following description of an exemplary embodiment thereof, reference being made to the accompanying drawings, wherein:

Figure 3 is an enlarged vertical section taken on the line 3—3 of Figure 1;

Figure 4 is an enlarged inclined section taken on the line 4—4 of Figure 1;

Figure 5 is an enlarged inclined section taken on the line 5—5 of Figure 1;

Figure 6 is an enlarged vertical section taken on the line 6—6 of Figure 1;

Figure 7 is an enlarged horizontal section taken on the line 7—7 of Figure 2;

Figure 8 is an enlarged horizontal section taken on the line 8—8 of Figure 2;

Figure 9 is an enlarged horizontal section taken on the line 9—9 of Figure 1; and Figure 10 is an enlarged vertical section taken on the line 10—10 of Figure 1.

Figure 1:
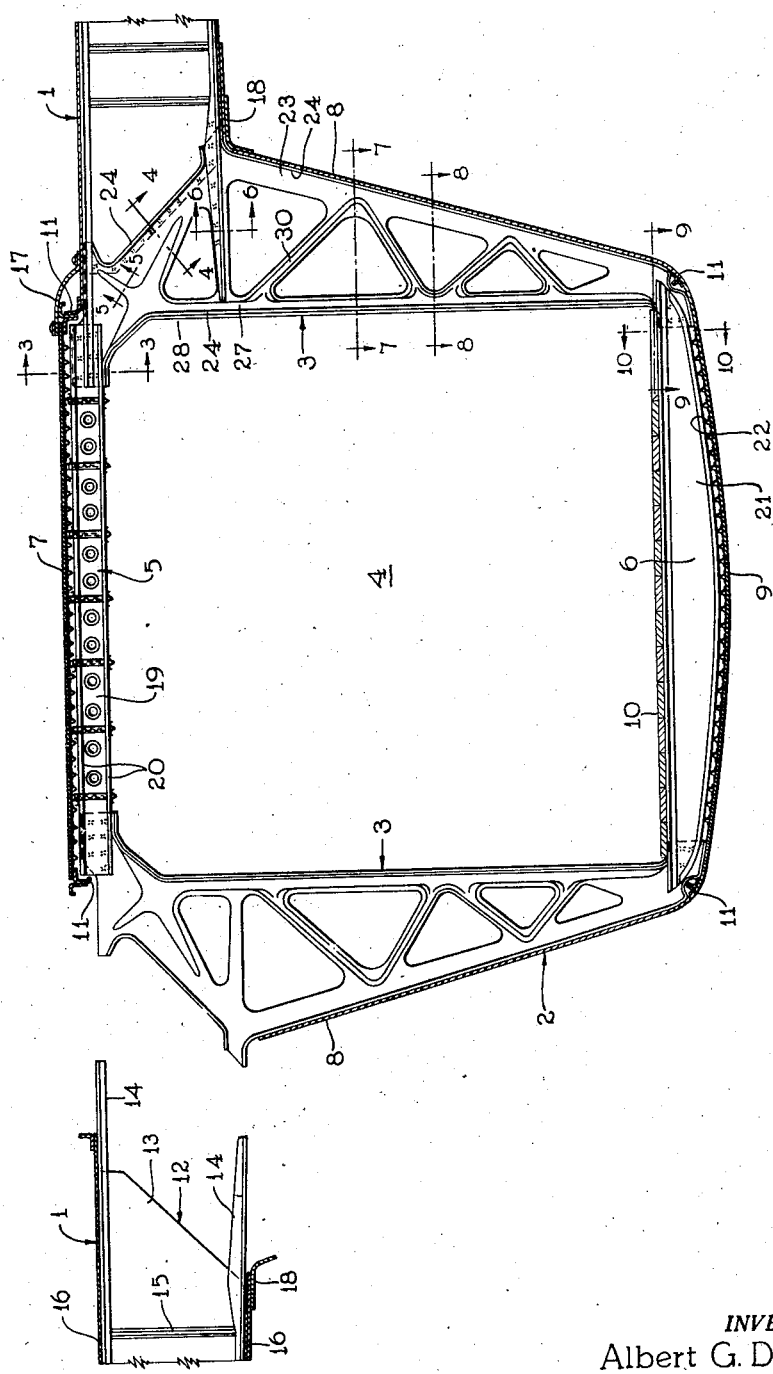
Figure 1 is a transverse section through an aircraft fuselage and wings in the connecting bulkhead region, one of the wings being shown in preassembly position.

The airfoils or wings 1 of the aircraft are secured to the sides of a fuselage 2. Specifically they are secured to the side bulkheads 3 which constitute parts of a strong girdle surrounding an open cargo compartment 4. The girdle also comprises an upper or roof girder 5 and a lower or floor girder 6. The top, sides, and bottom of the fuselage are covered by stringer-reinforced skin blankets 7, 8 and 9 respectively. The stringers of the top and bottom blakets are through-running, while those of the sides are intercostal between the several bulkheads. The floor is designated by the numeral 10. The fuselage sections are reinforced and joined by pairs of mating longerons 11 on the corners.

The wings comprise spars 12 each including a sheet web 13, chords or cap strips 14 and stiffening struts 15. The wings are covered by stressed stringer-reinforced skin blankets 16 which between the spars are directly connected through certain stringer ends or splicers to the intermediate bulkheads. These projecting stringers or stringer splicers correspond to and are connected like the spar cap strips illustrated and described herein, hence the stringer connections need not be described in detail. This analogy is evident from the copending application referred to. Upper fairing strips 17 and lower fairing strips 18 close the space between wing and fuselage blankets.

The upper girder 5 (Figure 3) comprises a plate web 19 and cap strips 20 and may be formed as a channel-section member with integral web and cap strips or flanges.

The bottom girder (Figure 10) comprises a plate web 21 and cap strips 22.

Each bulkhead comprises a monolithic pressed plate having a plate web 23 and edge flanges 24. Preferably two mating plates are provided and welded together. The edge flanges are discontinued where the spar cap strips 14 overlap and at the upper and lower laterally projecting ends 25, 26 respectively, where the ends of girders 5 and 6, respectively, overlap.

On the outer or tension side the bulkhead plates may be left flat within the edge flanges, but on the compression side they are preferably pressed out to form wales or ridges 27 which form a hollow box section between them. If the side edges are left in spaced relation they may be connected by an edge cover plate 28, which itself may be corrugated, as at 29.

The bulkhead plates are strengthened and stiffened by forming transverse pressed strut-like wales or ridges 30 in them, the matching wales of the paired plates forming box sections between them. If desired, the metal may be cut out between the wales for lightness, leaving a triangulated skeleton between the tension and compression sides. At places where the wales are omitted from the strut-like connections the angle strips, such as the spar cap strips 14, which are welded in overlapping relation to the strut connections serve the same purpose as the wales.

Figure 3 shows the connection between the projecting end 25 of the bulkhead plates 23 and the web 19 of the top girder. The edge flanges 24 are omitted at the top of the bulkhead plates and the upper spar (or wing blanket stringer, as the case may be) chord 14 is run through along the upper edge of the bulkhead and overlaps the end of the girder.

Figure 4 shows the connection between the end of the spar web 13 and the bulkhead plates, the web being sandwiched between the plates where spread apart at joggles and welded to them.

Figure 5 shows a typical bulkhead strut wale section.

Figure 6 shows the connection between the lower spar (or blanket) chord 14 and the webs of the bulkhead plates. Here the chord 14 is strengthened by a nesting angle-section splice strip which may be considered as part of it.

Figures 7 and 8 are typical transverse sections through the bulkhead.

Figure 2:
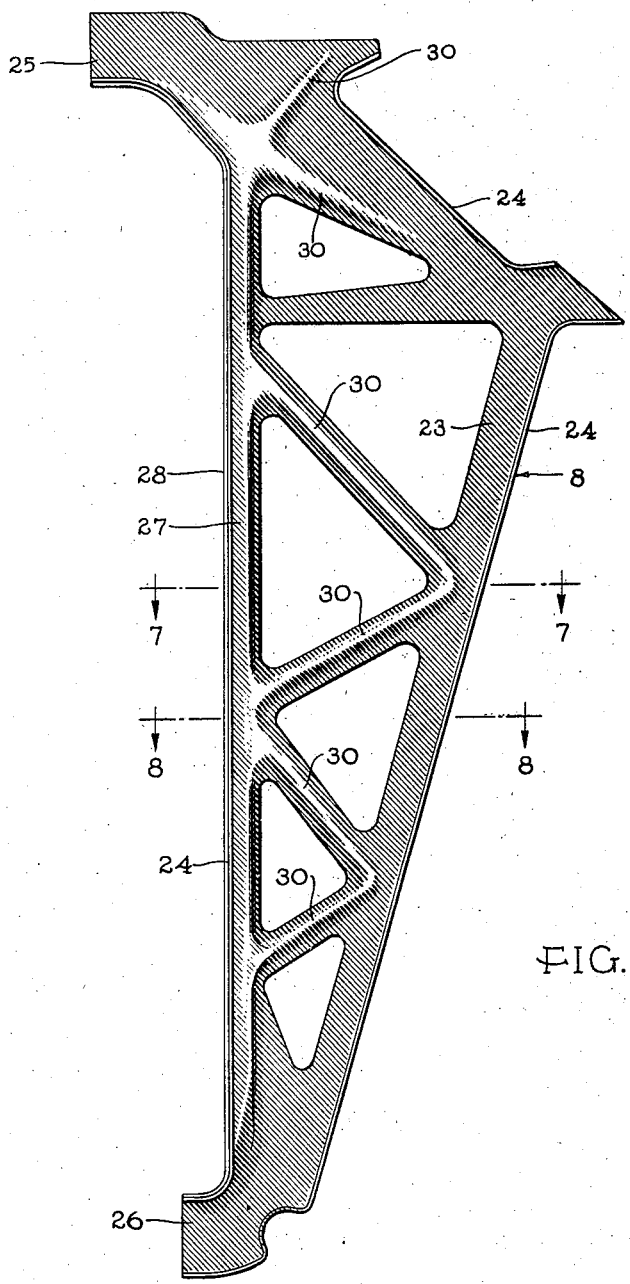
Figure 2 is a side elevation of a single pressed bulkhead sub-assembly alone.

Figure 9 shows the bulkhead in section just above its lower end, indicating how the wales on the compression side and the corrugation in the edge cover strip 28 have run out to leave flat plate material. This bulkhead shape is quite clearly shown in Figure 2.

Figure 10 shows the connection of the bulkhead to the bottom girder, the web 21 and cap strips 22 being overlapped and welded to the webs 23 of the bulkhead plates. The girder end extends well back of the laterally protruding end portion 26 to form a connection with the main body of the bulkhead web. This is well illustrated in Figures 1 and 9.

It is thus seen that the invention provides a very simple and light but strong and dependable wing-to-body construction. The one-piece triangular bulkheads with integral edge reinforcements and triangulated integral strut elements provide a very rigid connection. The structure of the bulkhead and its connection with the spar chords and web and with the ends of the girders are also of a simple but highly efficient character. In a light airplane construction a single bulkhead plate may be used, or lighter laminated plates, but in larger airplanes the laminated construction with oppositely flanged and box section elements is very efficient.

While one embodiment of the invention has been illustrated by way of example, it is to be understood that there may be various embodiments within the limits of the prior art and the scope of the subjoined claims.

What is claimed is:

1. An airplane comprising a generally triangular pressed metal bulkhead element with edge reinforcing portions and intermediate triangulated reinforcing hollow rib portions, the edge reinforcing portion being omitted at certain places, and wing and girder elements connected in shear to said bulkhead element, said wing and girder elements being overlapped with the sides of said bulkhead element where the edge reinforcing portions are omitted and some of the overlapped elements constituting part of the triangulated reinforcing portions of said bulkhead.

2. An airplane comprising a body girdle formed of top and bottom girders and side bulkheads, said bulkheads being formed of mating flanged and ribbed plates secured together to form box-section ribbed reinforcement on one side edge of the bulkhead and at intervals across its width and also oppositely directed lateral edge flanges, certain of said body girders being overlapped with and secured in shear to said bulkhead, wing cap strips overlapped with and secured in shear to said bulkhead, and a wing spar web plate overlapped with and secured in shear to said bulkhead.

3. An airplane comprising a body girdle formed of top and bottom girders and side bulkheads, said bulkheads being formed of mating, flanged and ribbed plates secured together to form box-section ribbed reinforcement on one side edge of the bulkhead and at intervals across its width and also oppositely directed lateral edge flanges, certain of said body girders being overlapped with and secured in shear to said bulkhead, wing cap strips overlapped with and secured in shear to said bulkhead, and a wing spar web plate overlapped with and secured in shear to said bulkhead, said spar web plate being sandwiched between the webs of the mating bulkhead plates.

4. An airplane comprising a body girdle formed of top and bottom girders and side bulkheads, said bulkheads being formed of mating, flanged and ribbed plates secured together to form box-section ribbed reinforcement on one side edge of the bulkhead and at intervals across its width and also oppositely directed lateral edge flanges, certain of said body girders being overlapped with and secured in shear to said bulkhead, wing cap strips overlapped with and secured in shear to said bulkhead, and a wing spar web plate overlapped with and secured in shear to said bulkhead, said bulkhead also including an edge cover plate secured to the flanges on the side having the ribbed reinforcement.

ALBERT G. DEAN.